(12) United States Patent
Uchida

(10) Patent No.: US 10,048,641 B2
(45) Date of Patent: Aug. 14, 2018

(54) IMAGE FORMING APPARATUS

(71) Applicant: KYOCERA Document Solutions Inc., Osaka (JP)

(72) Inventor: Kosuke Uchida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/529,733

(22) PCT Filed: Dec. 14, 2015

(86) PCT No.: PCT/JP2015/084940
§ 371 (c)(1),
(2) Date: May 25, 2017

(87) PCT Pub. No.: WO2016/111118
PCT Pub. Date: Jul. 14, 2016

(65) Prior Publication Data
US 2017/0329275 A1    Nov. 16, 2017

(30) Foreign Application Priority Data

Jan. 7, 2015    (JP) .................................. 2015-001675

(51) Int. Cl.
| | |
|---|---|
| G03G 21/00 | (2006.01) |
| B29L 11/00 | (2006.01) |
| G03G 15/043 | (2006.01) |
| G02B 26/08 | (2006.01) |
| G02B 26/12 | (2006.01) |
| G03G 15/32 | (2006.01) |

(52) U.S. Cl.
CPC ..... *G03G 21/0035* (2013.01); *G03G 21/0005* (2013.01); *G03G 21/007* (2013.01); *G03G 21/0047* (2013.01); *B29L 2011/0075* (2013.01); *G02B 26/0816* (2013.01); *G02B 26/129* (2013.01); *G03G 15/0435* (2013.01); *G03G 15/321* (2013.01)

(58) Field of Classification Search
CPC ..... G03G 21/0035; G03G 15/04; B08B 1/008
See application file for complete search history.

(56) References Cited

FOREIGN PATENT DOCUMENTS

JP    2012-185507 A    9/2012

OTHER PUBLICATIONS

Tajima (JP 2009-139816 A), Jun. 2009, JPO Computer Translation.*

* cited by examiner

*Primary Examiner* — Erika J Villaluna
(74) *Attorney, Agent, or Firm* — Studebaker & Brackett PC

(57) ABSTRACT

An optical scanning device (12) includes cleaning holders (511, 512), light transmitting members (52), a linear member (54), a winding motor (55), and stoppers (56a, 56b). The two cleaning holders (511, 512) are coupled to the linear member (54). The linear member 54 is driven to circulate by the winding motor (55), whereby the two cleaning holders (511, 512) move and each cleaning member slides on a corresponding one of the light transmitting members (52). When the cleaning holders (511, 512) come into contact with the respective stoppers (56a, 56b), the stoppers (56a, 56b) restrict movement of the respective cleaning holders (511, 512) in one of directions of extension of the light transmitting members (52). A contact determining section (913) determines, based on a current value of the winding motor (55), that the cleaning holder (511, 512) has come into contact with the stopper (56a, 56b).

9 Claims, 12 Drawing Sheets

IMAGE FORMING APPARATUS

TECHNICAL FIELD

The present invention relates to an image forming apparatus including an optical scanning device that irradiates image bearing members with light to form electrostatic latent images thereon.

BACKGROUND ART

An optical scanning device is provided in an image forming apparatus such as an electrophotographic color copier or an electrophotographic color printer. The optical scanning device irradiates a plurality of charged image bearing members with light to form electrostatic latent images on the respective image bearing members. A housing of the optical scanning device includes an accommodation portion having a face an opening and a cover portion covering the opening. An optical scanning system is provided inside the accommodation portion. The cover portion has exit openings for respective beams of light emitted from the optical scanning system. The exit openings each correspond to one of the image bearing members. Further, the exit openings are each covered by a light transmitting member. The light transmitting member is capable of transmitting light emitted from the optical scanning system.

The light transmitting members are provided to prevent toner, dust, or the like from entering the inside of the optical scanning device. Optical properties may be deteriorated by adhesion of toner, dust, or the like to some or all of optical components located inside the optical scanning device. Deterioration of the optical properties results in deterioration of quality of an image formed on a recording medium such as paper.

Alternatively, the optical properties may also be deteriorated by adhesion of toner, dust, or the like to outer surfaces of some or all of the light transmitting members. Therefore, it is necessary to clean outer surfaces of the respective light transmitting members periodically. For example, Patent Literature 1 discloses an automatic cleaning device that automatically cleans outer surfaces of respective light transmitting members. The automatic cleaning device moves a plurality of cleaning holders in the same direction simultaneously by respective screw shafts arranged to extend in longitudinal directions of the light transmitting members. The cleaning holders each hold a single cleaning member. When the cleaning holders move along respective movement tracks, the cleaning members each slide on the outer surface of a corresponding one of the light transmitting members. Through the above, the light transmitting members are cleaned simultaneously. Further, the above automatic cleaning device reverses a direction of movement of each cleaning holder by using reaction force of an operation return spring.

CITATION LIST

Patent Literature

[Patent Literature 1]
Japanese Patent Application Laid-Open Publication No. 2012-185507

SUMMARY OF INVENTION

Technical Problem

However, in a configuration in which a direction of movement of each cleaning holder is reversed using reaction force of an operation return spring as in the automatic cleaning device disclosed by Patent Literature 1, there was a problem that a time it takes to reverse the direction of movement of the cleaning holders increases a time it takes to perform cleaning.

In view of the above problem, it is an object of the present invention to provide an image forming apparatus that can reduce a time it takes to clean light transmitting members.

Solution to Problem

An image forming apparatus according to the present invention includes an optical scanning device that irradiates a plurality of image bearing members with laser light to form electrostatic latent images thereon. The image forming apparatus includes a housing, a plurality of light transmitting members, a plurality of cleaning members, a linear member, a drive motor, a first cleaning holder, a second cleaning holder, a first stopper, a second stopper, and a contact determining section. The housing has a plurality of laser light exit openings arranged side by side, each corresponding to one of the image bearing members and extending in a main scanning direction of the laser light. The light transmitting members are capable of transmitting the laser light, each cover one of the laser light exit openings, and extend in the main scanning direction of the laser light. The cleaning members are each located at a position corresponding to one of the light transmitting members and clean the corresponding one of the light transmitting members by sliding thereon. The linear member is looped in a circle about the housing. The drive motor circulates the linear member in a first direction and a second direction different from the first direction. The first and second cleaning holders each hold at least two of the cleaning members and move in respective directions of extension of the light transmitting members when the linear member is circulated by the drive motor. The first stopper is provided at an end of a movement track of the first cleaning holder and restricts movement of the first cleaning holder in one of the directions of extension of the light transmitting members when the first cleaning holder comes into contact with the first stopper. The second stopper is provided at an end of a movement track of the second cleaning holder and restricts movement of the second cleaning holder in one of the directions of extension of the light transmitting members when the second cleaning holder comes into contact with the second stopper. The contact determining section determines, based on a current value of the drive motor, that the first cleaning holder has come into contact with the first stopper and that the second cleaning holder has come into contact with the second stopper.

Advantageous Effects of Invention

According to the present invention, a time it takes to clean the light transmitting members can be reduced.

DESCRIPTION OF EMBODIMENTS

Figure 1:
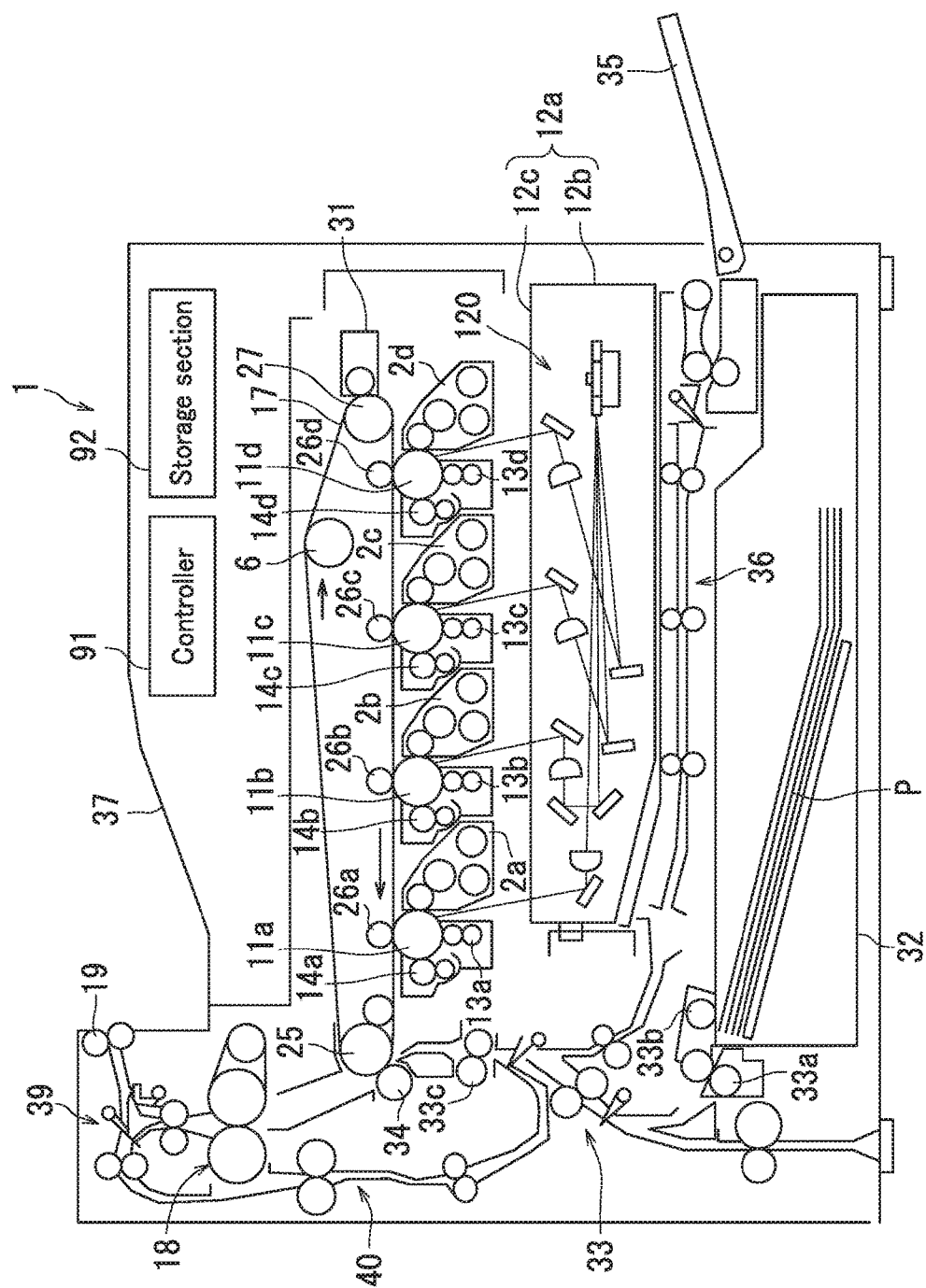
FIG. 1 is a cross-sectional view schematically illustrating an overall configuration of an image forming apparatus according to an embodiment of the present invention.

The following describes an embodiment of the present invention with reference to the drawings. Note that in the drawings, elements that are the same or substantially equivalent are labelled using the same reference signs and explanation thereof will not be repeated. The drawings schematically illustrate elements of configuration in order to facilitate understanding. Therefore, properties of the elements of configuration illustrated in the drawings, such as thicknesses and lengths thereof, may differ from actual properties thereof in order to facilitate preparation of the drawings.

First, a structure of an image forming apparatus 1 of the present embodiment will be described with reference to FIG. 1. FIG. 1 is a cross-sectional view schematically illustrating an overall configuration of the image forming apparatus 1.

The image forming apparatus 1 is a tandem-type color printer. The image forming apparatus 1 includes rotatable photosensitive drums 11a to 11d as a plurality of photosensitive members (image bearing members). Organic photosensitive members (OPC photosensitive members) each having an organic photosensitive layer, amorphous silicon photosensitive members each having an amorphous silicon photosensitive layer, and the like are used for the photosensitive drums 11a to 11d. The photosensitive drums 11a to 11d each corresponding to one of magenta, cyan, yellow, and black are arranged in tandem.

A developing device 2a, a charger 13a, and a cleaning device 14a are provided around the photosensitive drum 11a. Similarly, developing devices 2b to 2d, chargers 13b to 13d, and cleaning devices 14b to 14d are each provided around a corresponding one of the photosensitive drums 11b to 11d. Further, an optical scanning device 12 is provided below the developing devices 2a to 2d. The optical scanning device 12 irradiates the photosensitive drums 11a to 11d with light to form electrostatic latent images on the respective photosensitive drums 11a to 11d. In the present description, "below" and "above" respectively refer to "below" and "above" as seen in the drawings.

The developing devices 2a to 2d are each located on the right of a corresponding one of the photosensitive drums 11a to 11d. The developing devices 2a to 2d are each located opposite to the corresponding one of the photosensitive drums 11a to 11d and each supply a toner to the corresponding one of the photosensitive drums 11a to 11d. In the present description, "right" and "left" respectively refer to "right" and "left" as seen in the drawings.

The chargers 13a to 13d are each located upstream of a corresponding one of the developing devices 2a to 2d in a rotation direction of a corresponding photosensitive member and opposite to the surface of a corresponding one of the photosensitive drums 11a to 11d. The chargers 13a to 13d each charge the surface of the corresponding one of the photosensitive drums 11a to 11d uniformly.

The optical scanning device 12 irradiates the photosensitive drums 11a to 11d by performing light scanning based on image data of a letter, a pattern, or the like input to an image input section from a personal computer or the like. A housing 12a of the optical scanning device 12 includes an accommodation portion 12b having a face with an opening and a cover portion 12c covering the opening. An optical scanning system 120 is provided inside the accommodation portion 12b. The cover portion 12c has laser light exit openings for respective beams of light (laser light) emitted from the optical scanning system 120. The laser light exit openings each correspond to one of the photosensitive drums 11a to 11d. Further, the laser light exit openings are each covered by a light transmitting member as described further below with reference to FIG. 2. The light transmitting members are capable of transmitting the respective beams of light emitted from the optical scanning system 120.

The optical scanning system 120 includes a laser light source (not illustrated) and a polygon mirror. The optical scanning system 120 also includes at least one reflecting mirror and a lens for each of the photosensitive drums 11a to 11d. Laser light emitted from the laser light source is incident on the surfaces of the respective photosensitive drums 11a to 11d downstream of the chargers 13a to 13d in rotation directions of the respective photosensitive members via the polygon mirror, the reflecting mirrors, and the lenses. The laser light forms electrostatic latent images on the surfaces of the respective photosensitive drums 11a to 11d. The electrostatic latent images are developed into toner images by the developing devices 2a to 2d.

An endless intermediate transfer belt 17 is wound around a tension roller 6, a drive roller 25, and a driven roller 27. The drive roller 25 is rotated by a motor. The intermediate transfer belt 17 is circulated by rotation of the drive roller 25.

The photosensitive drums 11a to 11d are arranged below the intermediate transfer belt 17 so as to be adjacent to one another in a conveyance direction (direction of an arrow in FIG. 1). The photosensitive drums 11a to 11d are each in contact with the intermediate transfer belt 17. Primary transfer rollers 26a to 26d are each located opposite to a corresponding one of the photosensitive drums 11a to 11d with the intermediate transfer belt 17 therebetween. The primary transfer rollers 26a to 26d are each in press contact with the intermediate transfer belt 17 and each form a primary transfer section with the corresponding one of the photosensitive drums 11a to 11d. The toner images are transferred to the intermediate transfer belt 17 at the primary transfer sections. Specifically, the toner images are transferred from the photosensitive drums 11a to 11d to the intermediate transfer belt 17 in order at specific timings while the intermediate transfer belt 17 is circulated. Through the above, a full color toner image is formed on the surface of the intermediate transfer belt 17. The full color toner image is a toner image formed by superimposing the toner images in respective four colors of magenta, cyan, yellow, and black.

A secondary transfer roller 34 is located opposite to the drive roller 25 with the intermediate transfer belt 17 therebetween. The secondary transfer roller 34 is in press contact with the intermediate transfer belt 17 and forms a secondary transfer section with the drive roller 25. The toner image is transferred from the intermediate transfer belt 17 to paper P at the secondary transfer section. After transfer of the toner image, a belt cleaning device 31 cleans toner remaining on the intermediate transfer belt 17.

A paper feed cassette 32 is provided in a lower part of the image forming apparatus 1. The paper feed cassette 32 is capable of accommodating a plurality of sheets of paper P. A stacking tray 35 for manual paper feeding is provided on the right of the paper feed cassette 32. A first paper conveyance path 33 is provided on the left of the paper feed cassette 32. Paper P fed from the paper feed cassette 32 is conveyed through the first paper conveyance path 33 to the secondary transfer section. Further, a second paper conveyance path 36 is provided on the left of the stacking tray 35. Paper fed from the stacking tray 35 is conveyed through the second paper conveyance path 36 to the secondary transfer section. Further, a fixing section 18 and a third paper conveyance path 39 are provided in an upper left part of the image forming apparatus 1. The fixing section 18 performs a fixing process on the paper P with an image formed thereon. The paper P subjected to the fixing process is conveyed through the third paper conveyance path 39 to a paper ejecting section 37.

The paper feed cassette 32 can be pulled outside the body of the image forming apparatus 1 (to the front side in FIG. 1). Thus, the paper feed cassette 32 can be replenished with paper P. Paper P accommodated in the paper feed cassette 32 is fed to the first paper conveyance path 33 by a pickup roller 33b and a retard roller pair 33a. When a plurality of sheets of paper P are accommodated in the paper feed cassette 32, the pickup roller 33b and the retard roller pair 33a feed the paper P sheet-by-sheet to the first paper conveyance path 33.

The first paper conveyance path 33 and the second paper conveyance path 36 join together before (upstream of) a registration roller pair 33c. The registration roller pair 33c conveys the paper P to the secondary transfer section. The registration roller pair 33c adjusts timings of image formation on the intermediate transfer belt 17 and paper feeding to the secondary transfer section. The secondary transfer roller 34 to which a bias voltage is applied performs secondary transfer of the full color toner image from the intermediate transfer belt 17 to the paper P conveyed to the secondary transfer section. The paper P with the full color toner image transferred thereto is conveyed to the fixing section 18.

The fixing section 18 includes a fixing belt, a fixing roller, and a pressure roller. The fixing belt is heated by a heater. The fixing roller is in contact with an inner surface of the fixing belt. The pressure roller is in press contact with the fixing roller with the fixing belt therebetween. The fixing section 18 applies heat and pressure to the paper P with the toner image transferred thereto. Through the above, the fixing process is performed. After the toner image has been fixed on the paper P by the fixing section 18, the paper P is reversed in a fourth paper conveyance path 40 as necessary. In the above configuration, the secondary transfer roller 34 performs secondary transfer of the toner image to the reverse side of the paper P and the fixing section 18 fixes the transferred toner image. The paper P with the toner image fixed thereon is conveyed through the third paper conveyance path 39 and ejected to the paper ejecting section 37 by an ejection roller pair 19.

A controller 91 and a storage section 92 are provided in a suitable part of the image forming apparatus 1 (upper part in FIG. 1). The controller 91 controls overall operation of the image forming apparatus 1. The storage section 92 stores various information therein. Details of the controller 91 and the storage section 92 will be described further below with reference to FIG. 10.

Figure 2:
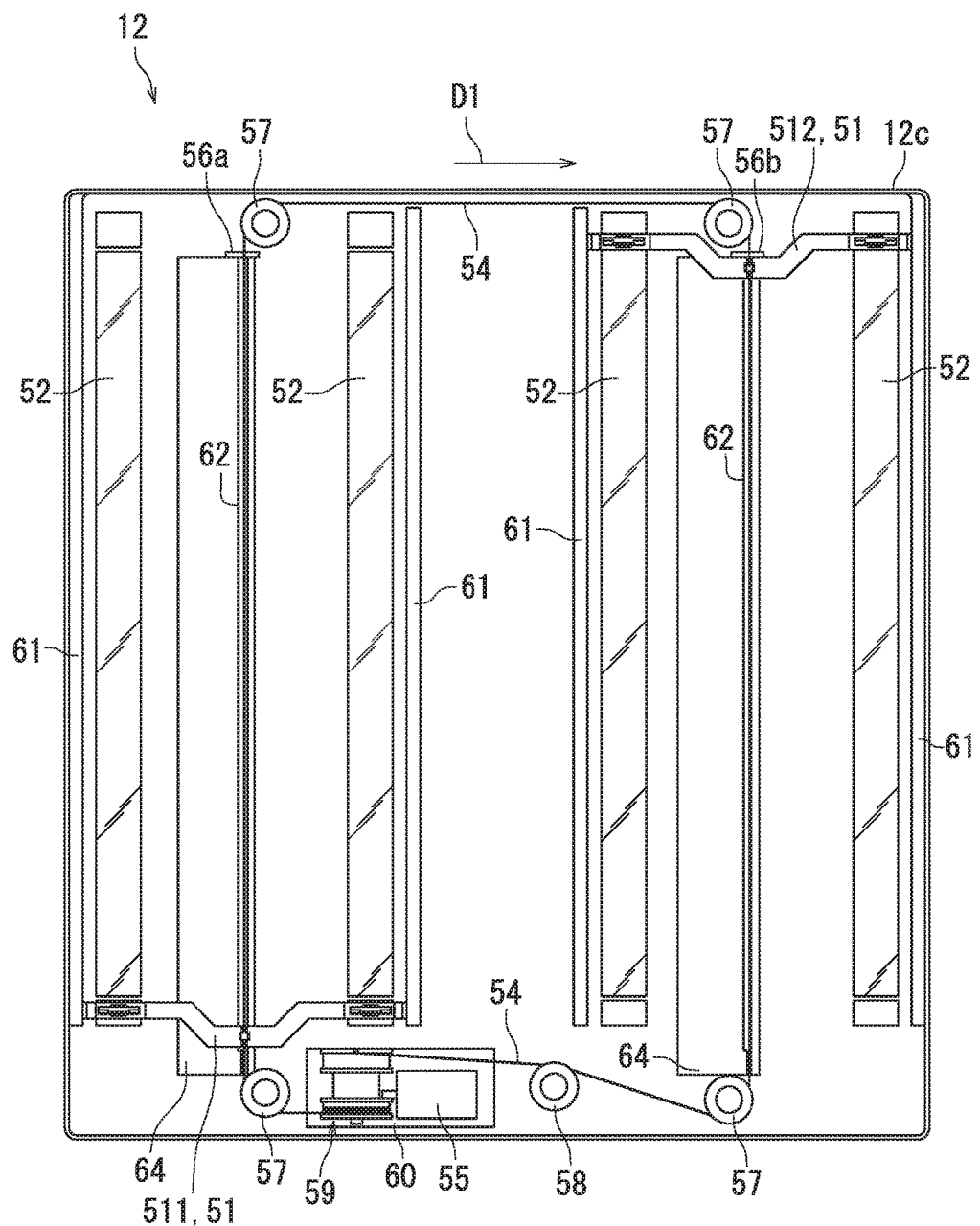
FIG. 2 is a plan view illustrating a cover portion of an optical scanning device according to the embodiment of the present invention.
Figure 3:
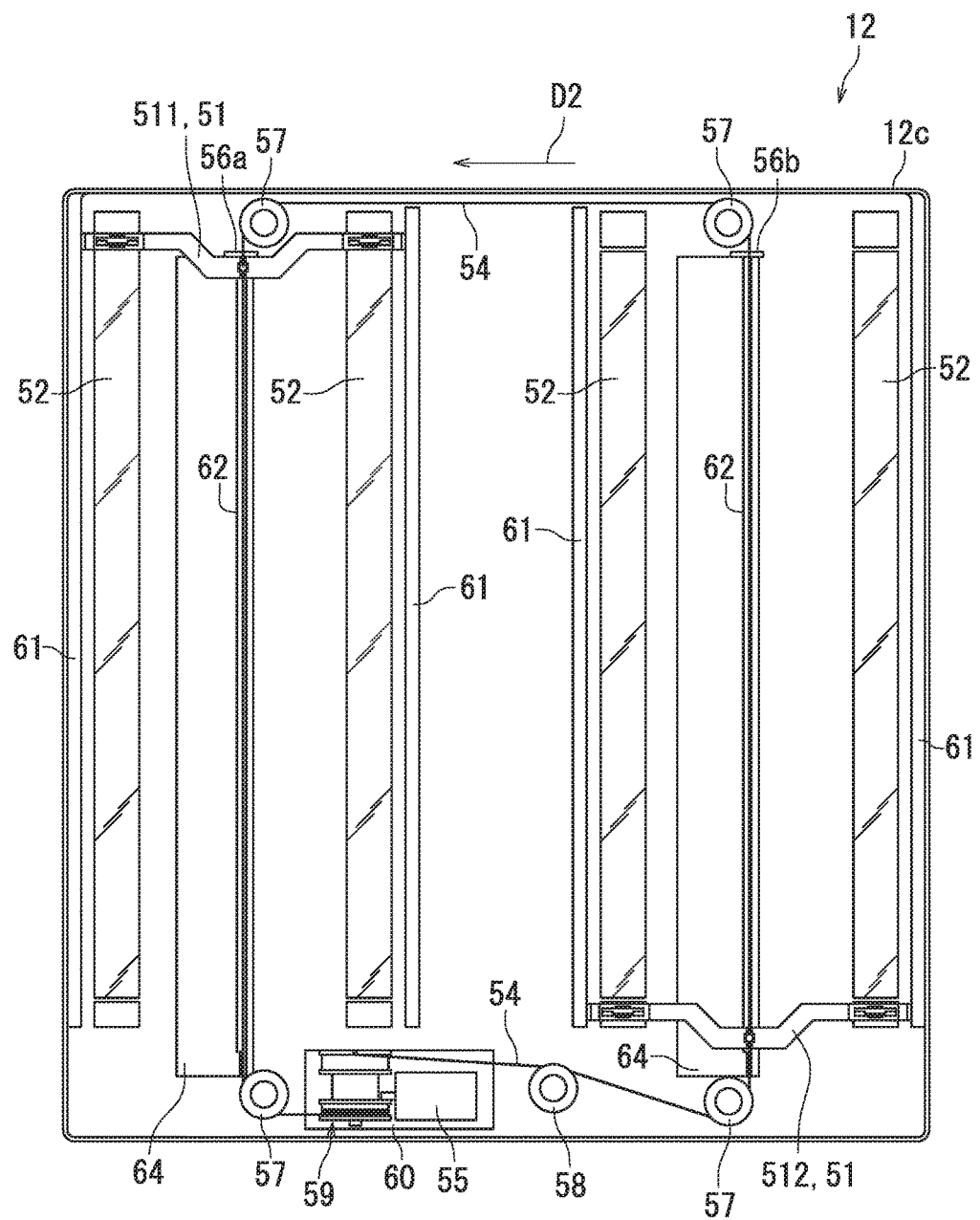
FIG. 3 is a plan view for explaining operations of cleaning holders provided on the cover portion according to the embodiment of the present invention.
Figure 4:
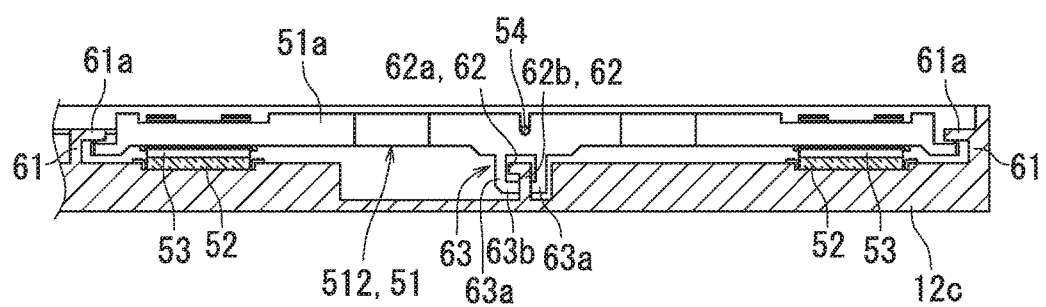
FIG. 4 is a cross-sectional view illustrating a part of the cover portion according to the embodiment of the present invention.

Next, the following describes the optical scanning device 12 with reference to FIGS. 2, 3, and 4. FIG. 2 is a plan view illustrating the cover portion 12c of the optical scanning device 12. FIG. 3 is a plan view for explaining operations of cleaning holders 51 provided on the cover portion 12c. FIG. 4 is a cross-sectional view of a part of the cover portion 12c illustrating a cleaning holder 51 viewed from the front.

As described above, the housing 12a of the optical scanning device 12 includes the accommodation portion 12b and the cover portion 12c attached to the accommodation portion 12b. The cover portion 12c has the four laser light exit openings arranged side by side and each corresponding to one of the four photosensitive drums 11a to 11d. The laser light exit openings each have a rectangular shape elongate in a main scanning direction of a corresponding beam of the laser light. The laser light exit openings are formed parallel with one another in longitudinal directions thereof. The laser light exit openings are each covered by a light transmitting member 52 in the form of a rectangular plate. The four light transmitting members 52 are arranged side by side parallel with one another in longitudinal directions thereof. The light transmitting members 52 are each provided to prevent toner, dust, or the like from entering the inside of the optical scanning device 12. The light transmitting members 52 each are for example a glass cover.

The optical scanning device 12 includes a first cleaning holder 511 and a second cleaning holder 512 as two cleaning holders 51.

The cleaning holders 51 each have a holding portion 51a (see FIG. 4). The holding portion 51a extends across adjacent two light transmitting members 52 and holds two cleaning members 53. The cleaning holders 51 are provided on the outer surface of the cover portion 12c (a surface facing the photosensitive drums 11a to 11d). The cleaning members 53 are each held by the holding portion 51a so as to be located at a position corresponding to one of the light transmitting members 52. The cleaning members 53 each are for example a rubber pad. The rubber pad may be made from for example a silicone rubber. The cleaning holders 51 are each made from for example a resin. It should be noted that the cleaning members 53 are not limited to rubber pads, and may be non-woven cloth.

The cleaning holders 51 are each coupled to a linear member 54 looped substantially in a circle so as to pass between adjacent two light transmitting members 52. The linear member 54 is circulated by driving force generated by a winding motor 55 which is a driving section. The linear member 54 is for example a wire.

In accompaniment with circulation of the linear member 54, the four cleaning members 53 each slide on the outer surface of a corresponding one of the four light transmitting members 52 (a surface facing the photosensitive drums 11a to 11d). Through the above, the outer surfaces of the respective light transmitting members 52 are simultaneously cleaned by the cleaning members 53.

The winding motor 55 is rotatable in both forward and backward directions. Therefore, a cleaning process can be repeatedly performed on the light transmitting members 52. Specifically, the winding motor 55 is for example a direct current motor with a brush. In the present embodiment, the winding motor 55 is rotated in the forward and backward directions in a single cleaning process to cause the cleaning members 53 each reciprocate in the longitudinal direction of a corresponding one of the light transmitting members 52. The winding motor 55 is an example of a "drive motor". The cleaning process is periodically performed every time printing (image formation) has been performed on for example about 1,000 sheets of paper. Alternatively, the cleaning process may be performed in response to a user's operation on an input device such as a touch panel while the image forming apparatus 1 is in a maintenance mode.

In the present embodiment, the two cleaning holders 511 and 512 linearly move in the longitudinal directions of the light transmitting members 52 (a main scanning direction of the laser light) oppositely to each other in accompaniment with circulation of the linear member 54. A first stopper 56a is provided at an end of a movement track of the first cleaning holder 511 and a second stopper 56b is provided at an end of a movement track of the second cleaning holder 512. The first and second stoppers 56a and 56b are each located between adjacent two light transmitting members 52 at corresponding longitudinal ends of the light transmitting members 52. When the first cleaning holder 511 comes into contact with the first stopper 56a or the second cleaning holder 512 comes into contact with the second stopper 56b at the end of the movement track thereof, circulation of the linear member 54 stops. When circulation of the linear member 54 stops and a load applied to the winding motor 55 increases, a rotation direction of the winding motor 55 is reversed or the winding motor 55 stops. The first stopper 56a and the second stopper 56b may be made from for example a resin. In a situation in which the first stopper 56a and the second stopper 56b are made from a resin, the first stopper 56a and the second stopper 56b may be formed integrally with the cover portion 12c.

The following describes operations of the cleaning holders 51 in a single cleaning process with reference to FIGS. 2 and 3. In the present embodiment, the cleaning members 53 each reciprocate once in the longitudinal direction of a corresponding one of the light transmitting members 52 in a single cleaning process as described above. The following describes a case where a direction in which the linear member 54 is circulated changes from a direction of an arrow D1 (a first direction) to a direction of an arrow D2 (a second direction) during the cleaning process.

Once the cleaning process is started, the winding motor 55 is controlled according to instructions from the controller 91 (see FIG. 1) to perform a "first operation", a "second operation", and a "third operation" in order. In the first operation, the linear member 54 initially circulates in the first direction indicated by the arrow D1 (see FIG. 2). Through the above, the first and second cleaning holders 511 and 512 move from positions illustrated in FIG. 2 to positions illustrated in FIG. 3, and the first cleaning holder 511 comes into contact with the first stopper 56a at the end of the movement track thereof. As a result, circulation of the linear member 54 stops and the first and second cleaning holders 511 and 512 stop. At this time, a load applied to the winding motor 55 increases. In response to the increase of the load, the winding motor 55 stops. Then, a rotation direction of the winding motor 55 is reversed.

In the second operation, the linear member 54 initially circulates in the second direction indicated by the arrow D2 (a direction opposite to the first direction) (see FIG. 3). Through the above, the first and second cleaning holders 511 and 512 move from the positions illustrated in FIG. 3 to the positions illustrated in FIG. 2, and the second cleaning holder 512 comes into contact with the second stopper 56b at the end of the movement track thereof. As a result, circulation of the linear member 54 stops and the first and second cleaning holders 511 and 512 stop. At this time, a load applied to the winding motor 55 increases. In response to the increase of the load, the direction of rotation of the winding motor 55 is reversed.

Then, the "third operation" is performed. In the third operation, the linear member 54 initially circulates in the first direction indicated by the arrow D1 (see FIG. 2) for a specific time (for example, 75 msec). As a result, the first and second cleaning holders 511 and 512 move to respective predetermined standby positions HP and then the winding motor 55 stops. The standby positions HP are set outside an image writing region of each light transmitting member 52.

As described above, the first and second cleaning holders 511 and 512 are stopped at the respective standby positions HP. Therefore, damage to the first and second stoppers 56a and 56b can be reduced. Further, the first and second cleaning holders 511 and 512 are stopped apart from the first and second stoppers 56a and 56b, respectively. Therefore, the winding motor 55 can be activated easily.

Further, two cleaning members 53 held by each cleaning holder 51 move in the same direction during the cleaning process. If a single cleaning member 53 is held by a single cleaning holder, a required number of the cleaning holders is the same as the number of the light transmitting members 52. In such a configuration, a length of the linear member 54 necessary to move the cleaning holders is longer than in the present embodiment in which the plurality of cleaning members 53 are held by a single cleaning holder 51. Therefore, according to the present embodiment, the number of the cleaning holders and a required length of the linear member 54 can be reduced, resulting in cost reduction.

Also, in the present embodiment, four looping pulleys 57 are rotatably provided on the outer surface of the cover portion 12c. The four looping pulleys 57 are provided to loop the linear member 54 substantially in the specific form of a circle. Further, a tension adjusting pulley 58 is rotatably provided on the outer surface of the cover portion 12c. The linear member 54 is looped substantially in a circle around the plurality of looping pulleys 57 and the tension adjusting pulley 58. Specifically, the linear member 54 is looped around the four looping pulleys 57 in a manner that portions of the linear member 54 located between adjacent two light transmitting members 52 extend parallel with the longitudinal directions of the light transmitting members 52. The tension adjusting pulley 58 is provided to adjust tension applied to the linear member 54. The linear member 54 is capable of circulating smoothly since the linear member 54 is looped substantially in a circle using the rotatable pulleys 57 and 58.

Further, the linear member 54 is wound around a winding drum 59 a large number of turns. The linear member 54 is circulated by the winding motor 55 rotating the winding drum 59. The winding motor 55 and the winding drum 59 are located in a recess 60 formed in the cover portion 12c. Specifically, the winding drum 59 is rotatably provided in the recess 60 of the cover portion 12c. The winding motor 55 is fixed in the recess 60 of the cover portion 12c. It should be noted that the winding motor 55 may be fixed to the accommodation portion 12b.

The cleaning holders 51 engage with the cover portion 12c so as to be movable in the longitudinal directions of the light transmitting members 52. The following describes an example of engagement of each cleaning holder 51 and the cover portion 12c with reference to FIGS. 2 and 4.

In the present embodiment, two pairs of guide rails (guide members) 61 are provided on the outer surface of the cover portion 12c as illustrated in FIGS. 2 and 4. Each pair of the guide rails 61 corresponds to one of the cleaning holders 51. The guide rails 61 extend in the longitudinal directions of the light transmitting members 52. Opposite ends of each cleaning holder 51 (holding portion 51a) engage with a corresponding pair of the guide rails 61. Each cleaning holder 51 is guided by the corresponding pair of the guide rails 61 in the longitudinal directions of the light transmitting members 52. Therefore, each cleaning holder 51 can be stably moved in the longitudinal directions of the light transmitting members 52.

Further, the guide rails 61 each have an engaging portion 61a protruding toward a corresponding one of the cleaning holders 51. The engaging portions 61a, extend in the longitudinal directions of the light transmitting members 52. Upward movement (displacement) of each cleaning holder 51 is restricted by the engaging portions 61a of a corresponding pair of the guide rails 61 that engage with the opposite ends of the holding portion 51a of the cleaning holder 51 such that the opposite ends of the holding portion 51a do not move away from the housing 12a of the optical scanning device 12 (upwards in FIG. 4). Further, the engaging portions 61a prevent separation of each cleaning holder 51 from the cover portion 12c and cause each cleaning member 53 to be stably held in close contact with a corresponding one of the light transmitting members 52. More preferably, the engaging portions 61a are configured such that the opposite ends of the holding portion 51a of each cleaning holder 51 are in contact with the engaging portions 61a of a corresponding pair of the guide rails 61 at all times. In the above configuration, each cleaning member 53 can be pressed against a corresponding one of the light transmitting members 52. Therefore, each cleaning member 53 can be more stably held in close contact with the corresponding one of the light transmitting members 52.

Further, two guide ribs (guide members) 62 corresponding to the respective cleaning holders 51 stand on the outer surface of the cover portion 12c in the present embodiment. The guide ribs 62 each extend between adjacent two light transmitting members 52 in the longitudinal directions thereof. On the other hand, the cleaning holders 51 each have an engaging portion 63 at a lower end thereof. The engaging portions 63 each engage with a corresponding one of the guide ribs 62. Therefore, each cleaning holder 51 is guided by a corresponding one of the guide ribs 62 in the longitudinal directions of the light transmitting members 52. Through the above, each cleaning holder 51 can be stably moved in the longitudinal directions of the light transmitting members 52.

The guide ribs 62 are preferably located near the linear member 54. In the above configuration, swinging of each cleaning holder 51 during the cleaning process can be prevented. That is, each cleaning holder 51 can be more stably moved in the longitudinal directions of the light transmitting members 52. The guide ribs 62 are more preferably located just below the linear member 54. In the above configuration, swinging of each cleaning holder 51 during the cleaning process can be further prevented.

In the present embodiment, the linear member 54 is coupled to an upper end of the holding portion 51a of each cleaning holder 51, and the engaging portion 63 is provided at the lower end of the holding portion 51a of each cleaning holder 51. Therefore, the guide ribs 62 each engage with a corresponding one of the engaging portions 63 at a position just below a point of coupling between a corresponding one of the cleaning holders 51 and the linear member 54.

Further, in the present embodiment, each engaging portion 63 includes a pair of protrusions 63a protruding downwards from the cleaning holder 51, and each guide rib 62 is interposed between a corresponding pair of the protrusions 63a as illustrated in FIG. 4. Therefore, leftward and rightward movements of each cleaning holder 51 can be restricted. Also, swinging of each cleaning holder 51 about its axis extending in an up-and-down direction (swinging of each cleaning holder 51 in a direction of movement thereof) can be restricted.

Further, in the present embodiment, each guide rib 62 includes a protrusion 62b protruding from the cover portion 12c and an engaging portion 62a protruding from a distal end of the protrusion 62b. The engaging portion 62a protrudes leftwards (toward one of the opposite ends of the holding portion 51a) from the distal end of the protrusion 62b. On the other hand, each cleaning holder 51 has an engaging portion 63b protruding rightwards (toward the other of the opposite ends of the holding portion 51a) from one of the pair of the protrusions 63a of the engaging portion 63. The engaging portion 63b of the cleaning holder 51 engages with the engaging portion 62a of the guide rib 62. Therefore, upward movement of each cleaning holder 51 can be restricted. Further, separation of each cleaning holder 51 from the cover portion 12c can be prevented.

In a situation in which the opposite ends of the holding portion 51a of each cleaning holder 51 are held in contact with the engaging portions 61a of a corresponding pair of the guide rails 61 at all times and each cleaning member 53 is held in close contact with a corresponding one of the light transmitting members 52, each cleaning holder 51 may be deformed into an arc shape. When each cleaning holder 51 is deformed into the arc shape, a portion of each cleaning member 53 near the center of the cleaning holder 51 may be separated from a corresponding one of the light transmitting members 52. However, in the present embodiment, the cover portion 12c has the engaging portion 62a and each cleaning holder 51 has the engaging portion 63b. Therefore, when each cleaning holder 51 is caused to deform into an arc shape, the engaging portion 63b of the cleaning holder 51 is engaged with the engaging portion 62a of a corresponding one of the guide ribs 62 so as not to move away from the housing 12a of the optical scanning device 12, whereby arc-shaped deformation of the cleaning holder 51 is restricted. As a result, each cleaning member 53 can be stably held in close contact with a corresponding one of the light transmitting members 52. The engaging portion 63b of each cleaning holder 51 (engaging portion 63) is more preferably engaged with the engaging portion 62a of a corresponding one of the guide ribs 62 at a position lower than the light transmitting members 52. The above configuration is more effective to prevent the arc-shaped deformation of each cleaning holder 51.

Figure 5:
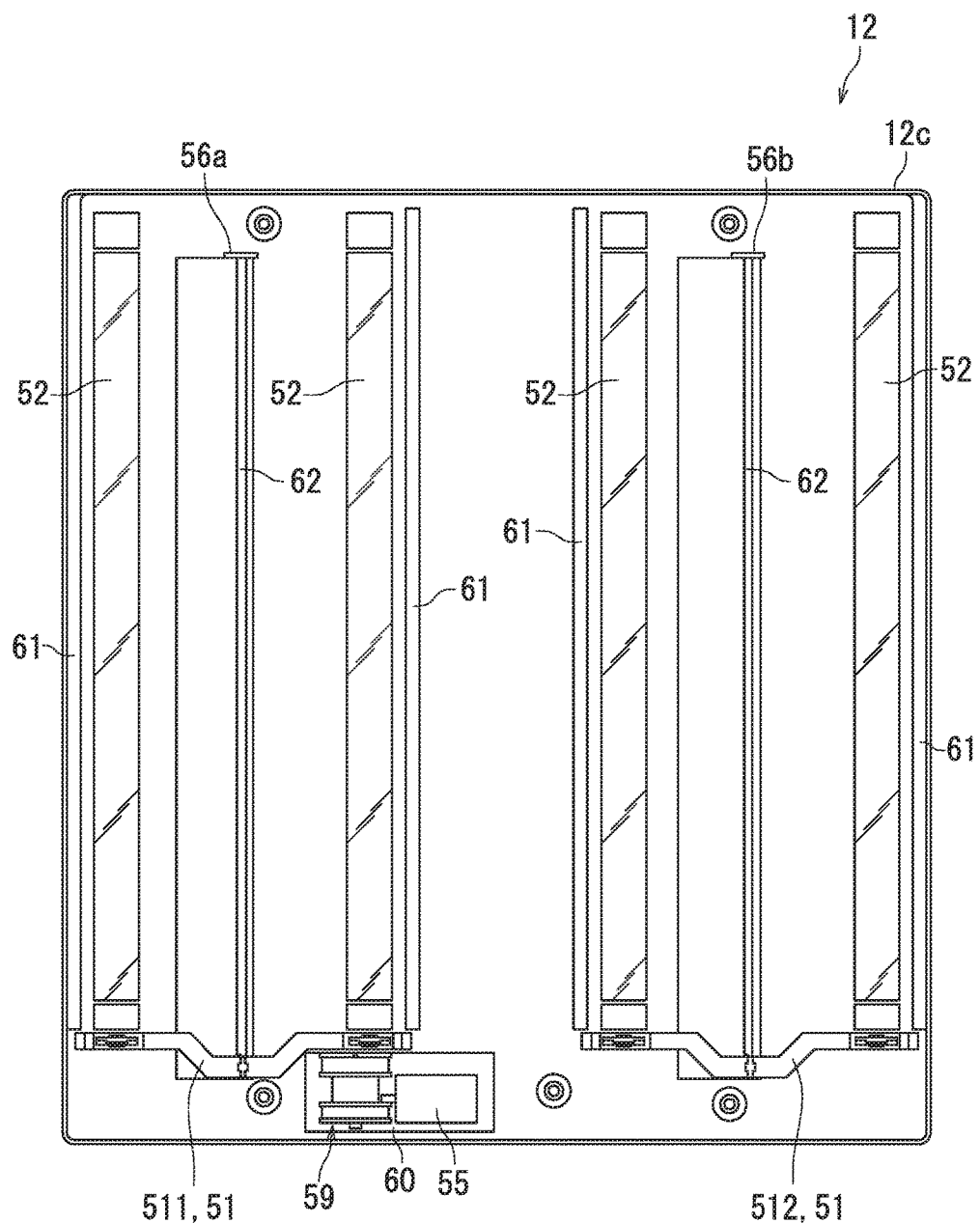
FIG. 5 is a plan view illustrating a state in which the cleaning holders are placed in respective cleaning holder attaching parts in the embodiment of the present invention.
Figure 6:
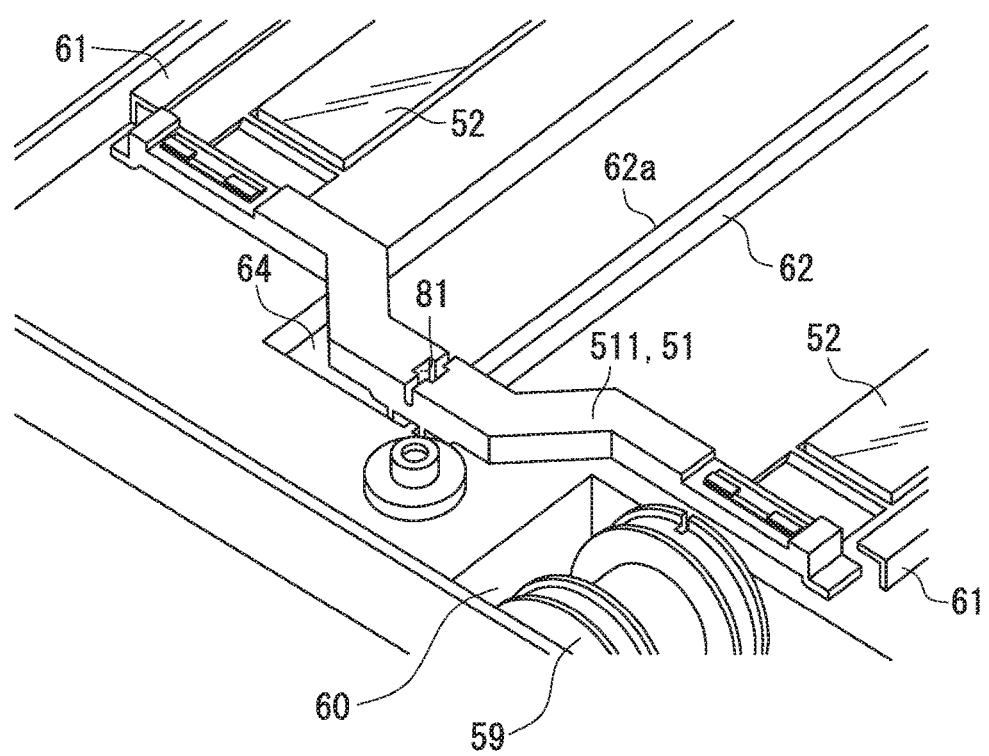
FIG. 6 is an enlarged perspective view illustrating a part of the cover portion according to the embodiment of the present invention.
Figure 7:
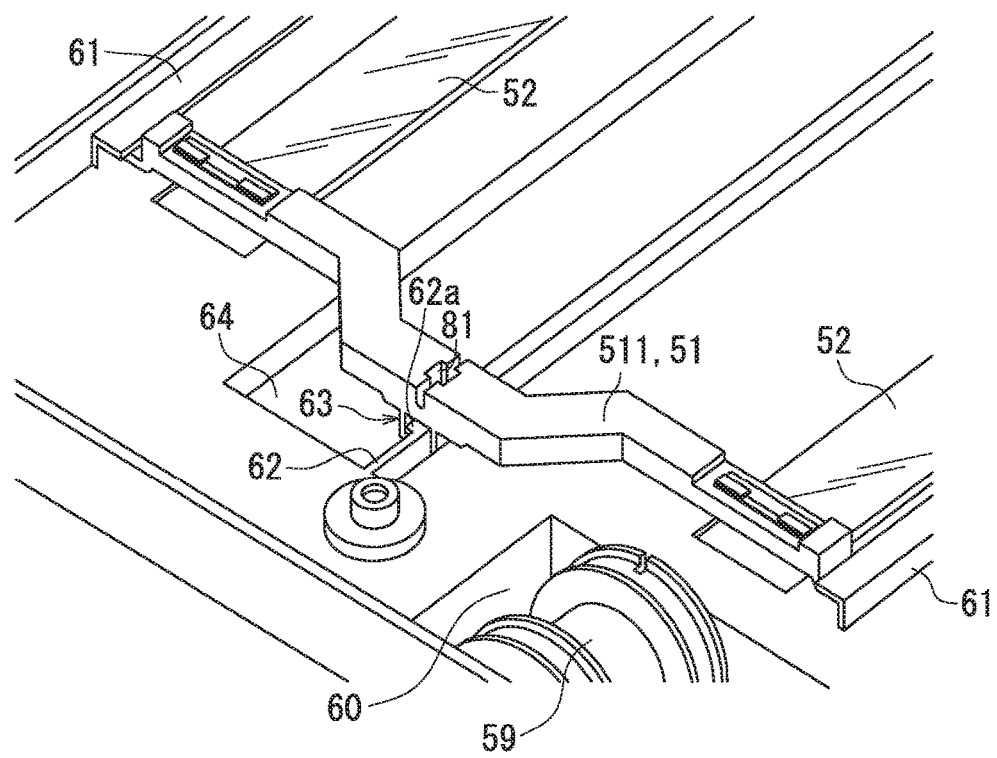
FIG. 7 is an enlarged perspective view illustrating a part of the cover portion according to the embodiment of the present invention.

Next, the following describes a method for attaching the cleaning holders 51 to the housing 12a (cover portion 12c) of the optical scanning device 12 with reference to FIGS. 5, 6, and 7. FIG. 5 is a plan view illustrating a state in which the cleaning holders 51 are placed in respective two cleaning holder attaching parts 64 (see FIG. 2) formed in the cover portion 12c. As illustrated in FIG. 2, the two cleaning holder attaching parts 64 corresponding to the respective cleaning holders 51 are provided. The cleaning holder attaching parts 64 in the present embodiment each are a recess. FIG. 6 is an enlarged perspective view of a part of the cover portion 12c illustrating a state in which the first cleaning holder 511 is placed in a corresponding one of the cleaning holder attaching parts 64. FIG. 7 is an enlarged perspective view of a part of the cover portion 12c illustrating a state in which the first cleaning holder 511 is engaged with a pair of the guide rails 61 and the guide rib 62.

As illustrated in FIG. 5, each cleaning holder 51 is placed in a corresponding one of the cleaning holder attaching parts 64 before the linear member 54 is placed. The cleaning holder attaching part 64 for the first cleaning holder 511 is provided outside an end of the movement track of the first cleaning holder 511 opposite to the end at which the first stopper 56a is provided. The cleaning holder attaching part 64 for the second cleaning holder 512 is provided outside an end of the movement track of the second cleaning holder 512 opposite to the end at which the second stopper 56b is provided.

As illustrated in FIG. 6, when the first cleaning holder 511 is placed in a corresponding one of the cleaning holder attaching parts 64, the opposite ends of the holding portion 51a of the first cleaning holder 511 are not engaged with a corresponding pair of the guide rails 61. Similarly, when the second cleaning holder 512 is placed in a corresponding one of the cleaning holder attaching parts 64, the opposite ends of the holding portion 51a of the second cleaning holder 512 are not engaged with a corresponding pair of the guide rails 61.

As illustrated in FIG. 7, the guide rib 62 with which the first cleaning holder 511 engages is provided along the light transmitting members 52 from the end of the movement track of the first cleaning holder 511 to the corresponding one of the cleaning holder attaching parts 64. That is, the guide rib 62 with which the first cleaning holder 511 engages is provided also in the cleaning holder attaching part 64. By contrast, the engaging portion 62a of the guide rib 62 is provided along the light transmitting members 52 from the end of the movement track of the first cleaning holder 511 to the other end thereof, but is not provided in the cleaning holder attaching part 64. Therefore, the engaging portion 63 of the first cleaning holder 511 can be easily engaged with the guide rib 62 by placing the first cleaning holder 511 into the cleaning holder attaching part 64 from above as illustrated in FIG. 6. Similarly, the engaging portion 63 of the second cleaning holder 512 can be easily engaged with a corresponding one of the guide ribs 62 by placing the second cleaning holder 512 into a corresponding one of the cleaning holder attaching parts 64 from above.

Each pair of the guide rails 61 extend in the longitudinal directions of the light transmitting members 52 from an end of the movement track of each cleaning holder 51 to the other end thereof, and are not provided in an area of extension of the cleaning holder attaching part 64 in a direction in which the light transmitting members 52 are arranged side by side (a direction orthogonal to the longitudinal directions of the light transmitting members 52). Therefore, the opposite ends of the holding portion 51a of the first cleaning holder 511 are engaged with a corresponding pair of the guide rails 61 by placing the first cleaning holder 511 in a corresponding one of the cleaning holder attaching parts 64 as illustrated in FIG. 6 and then moving the first cleaning holder 511 in the longitudinal directions of the light transmitting members 52 toward the first stopper 56a. At this time, the first cleaning holder 511 is guided by a corresponding one of the guide ribs 62. Therefore, the opposite ends of the holding portion 51a of the first cleaning holder 511 can be easily engaged with the corresponding pair of the guide rails 61. At this time, the engaging portion 63b of the first cleaning holder 511 engages with the engaging portion 62a of the corresponding one of the guide ribs 62. Thus, the engaging portion 63b of the first cleaning holder 511 can be easily engaged with the engaging portion 62a of the corresponding one of the guide ribs 62. Similarly to the first cleaning holder 511, the second cleaning holder 512 can be easily engaged with a corresponding pair of the guide rails 61 and the engaging portion 62a of a corresponding one of the guide ribs 62.

Figure 8:
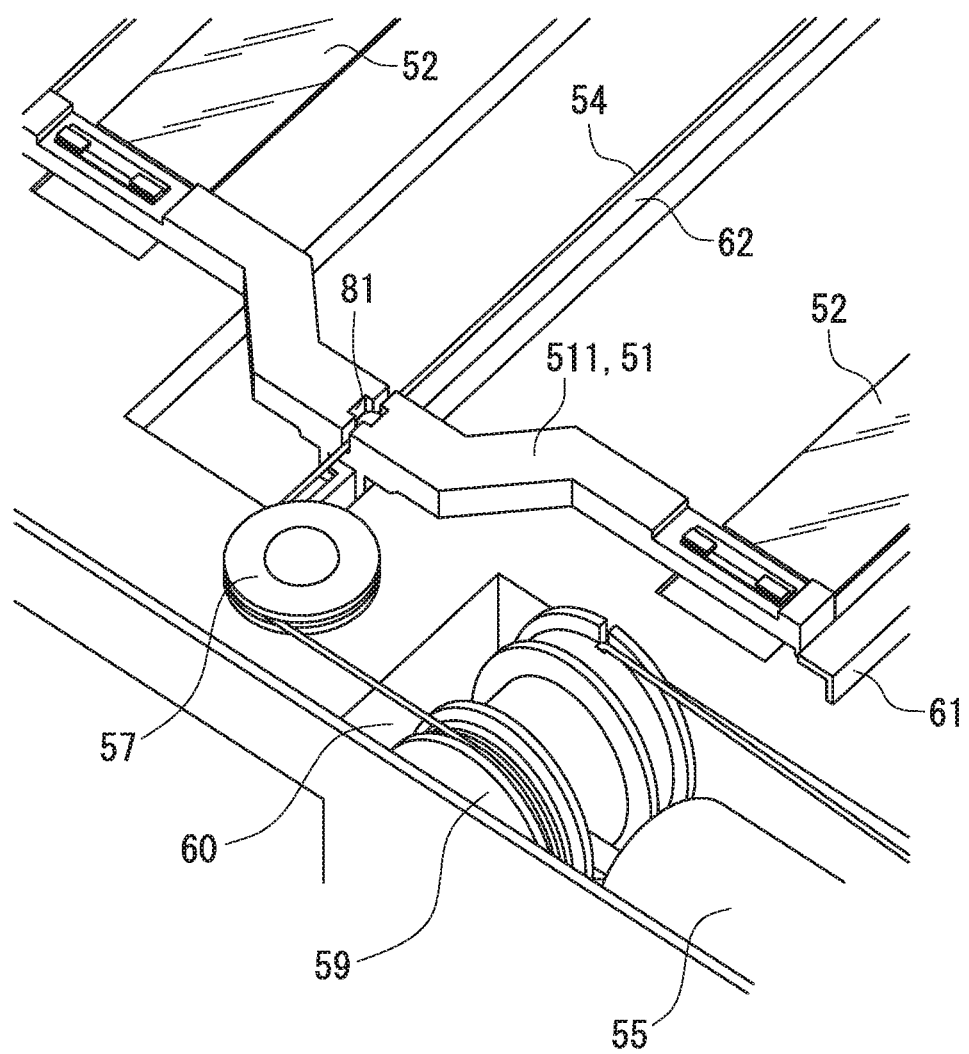
FIG. 8 is an enlarged perspective view illustrating a part of the cover portion according to the embodiment of the present invention.
Figure 9:
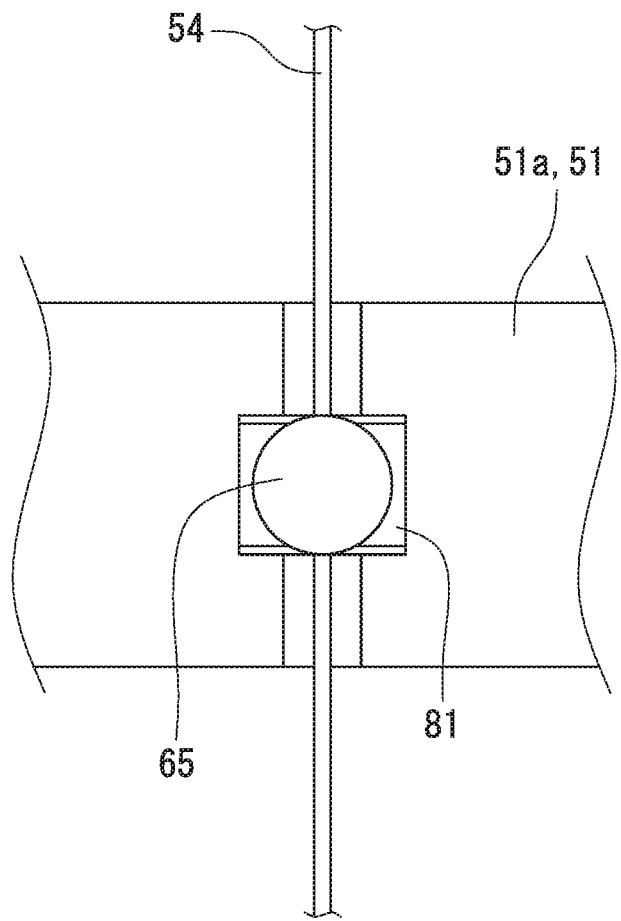
FIG. 9 is an enlarged plan view illustrating a part of a cleaning holder according to the embodiment of the present invention.

Next, the following describes an example of a means for coupling each cleaning holder 51 and the linear member 54 with reference to FIGS. 8 and 9. FIG. 8 is an enlarged perspective view illustrating a part of the cover portion 12c, and FIG. 9 is an enlarged plan view illustrating a part of the cleaning holder 51.

In the present embodiment, spherical coupling members 65 corresponding to the respective cleaning holders 51 are fixed to the linear member 54. Further, a recess 81 is formed in an upper part of the holding portion 51a of each cleaning holder 51. The spherical coupling members 65 are each loosely fitted in a corresponding one of the recesses 81. Through the above, each cleaning holder 51 is coupled to the linear member 54. The coupling members 65 may be fixed to the linear member 54 for example by caulking. The coupling members 65 may be made from for example a resin.

In the above configuration, even when posture of the cleaning holder 51 varies due to swinging or the like thereof, a load applied to the linear member 54 by the cleaning holder 51 in the varied posture is reduced. Therefore, lifetime of the linear member 54 can be extended.

As described above, the linear member 54 such as a wire is used in the present embodiment as a means for moving the cleaning holders 51. The diameter of the linear member 54 is smaller than that of traditionally used screw shafts. Therefore, the height of the optical scanning device 12 can be reduced.

Further, in the present embodiment, the first stopper 56a is provided at one of opposite ends of the movement track of the first cleaning holder 511 and the second stopper 56b is provided at one of opposite ends of the movement track of the second cleaning holder 512. When the first cleaning holder 511 comes into contact with the first stopper 56a at the one end of the movement track thereof, the second cleaning holder 512 is located at the other end of the movement track thereof. When the second cleaning holder 512 comes into contact with the second stopper 56b at the one end of the movement track thereof, the first cleaning holder 511 is located at the other end of the movement track thereof. When the first cleaning holder 511 comes into contact with the first stopper 56a, a rotation direction of the winding motor 55 is reversed. When the second cleaning holder 512 comes into contact with the second stopper 56b, the winding motor 55 stops. In the present embodiment, there is no need to provide stoppers at respective opposite ends of the movement track of each of the first and second cleaning holders 511 and 512. Therefore, the first stopper 56a and the second stopper 56b are provided only at the one ends of the respective movement tracks of the first and second cleaning holders 511 and 512 as described above. Due to the absence of stoppers at the other ends of the respective movement tracks of the first and second cleaning holders 511 and 512 opposite to the ends at which the first and second stoppers 56a and 56b are provided, the first and second cleaning holders 511 and 512 can be easily attached to the cover portion 12c at the other ends of the respective movement tracks without being interfered with stoppers. Thus, the first and second cleaning holders 511 and 512 as a cleaning mechanism can be easily attached to the optical scanning device 12.

Further, in the present embodiment, the cleaning holder attaching parts 64 are provided outside the other ends of the respective movement tracks of the first and second cleaning holders 511 and 512 opposite to the ends at which the first and second stoppers 56a and 56b are provided. Due to the cleaning holder attaching parts 64 formed in the cover portion 12c as above, the first and second cleaning holders 511 and 512 can be more easily attached to the housing 12a of the optical scanning device 12.

Figure 10:
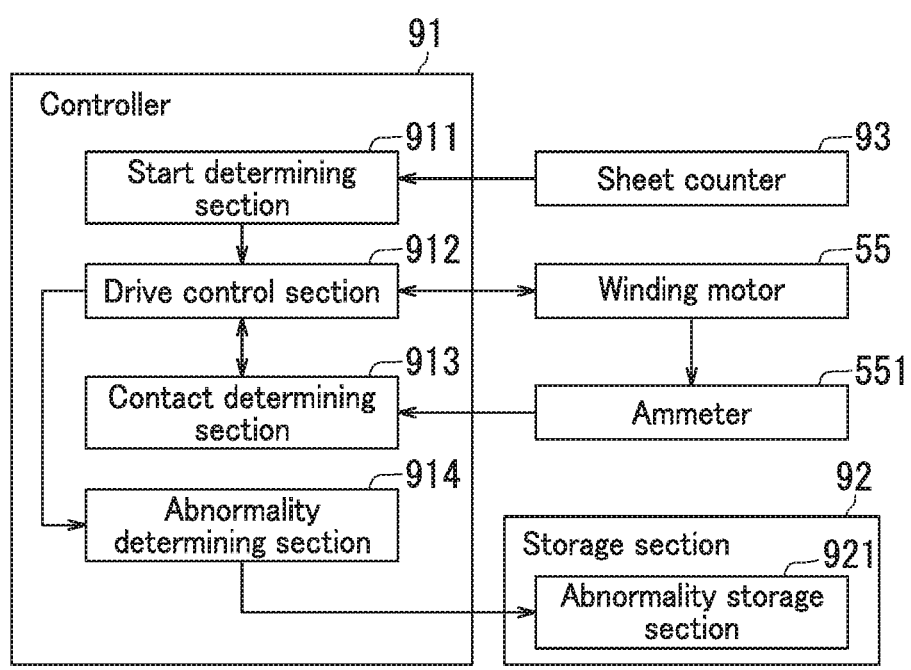
FIG. 10 is a diagram illustrating functional configurations of a controller and a storage section illustrated in FIG. 1.

Next, the following describes functional configurations of the controller 91 and the storage section 92 with reference to FIG. 10. FIG. 10 is a diagram illustrating the functional configurations of the controller 91 and the storage section 92 illustrated in FIG. 1. The controller 91 includes a central processing unit (CPU), a read only memory (ROM), and a random access memory (RAM). The ROM stores a control program therein. The CPU reads and executes the control program stored in the ROM to implement various functional sections such as a start determining section 911, a drive control section 912, a contact determining section 913, and an abnormality determining section 914. The RAM is used as a work area when the CPU executes the control program.

The storage section 92 is a non-volatile memory such as a flash memory, an electrically erasable programmable read-only memory (EEPROM), or a hard disk drive (HDD), and stores various information therein. The CPU reads and executes the control program stored in the ROM to cause the storage section 92 to function as an abnormality storage section 921.

The abnormality storage section 921 stores therein abnormality information indicating details of an abnormality in association with information of date and time at which the abnormality occurred. The abnormality information is for example information indicating conditions in which the abnormality occurred or information indicating reasons for determining that the abnormality occurred.

The start determining section 911 determines whether or not to start the cleaning process described above with reference to FIGS. 2 and 3. Specifically, when the image forming apparatus 1 received an instruction to perform printing and a sheet increment value N is at least a threshold value NS (for example, 1,000), the start determining section 911 determines to start the cleaning process. The instruction to perform printing is for example a print instruction input from a personal computer connected to the image forming apparatus 1 or a copy start instruction input from an operation input section of the image forming apparatus 1. The sheet increment value N is obtained by subtracting a sheet count at the time when the cleaning process was previously performed from a sheet count at the time when the image forming apparatus 1 received the instruction to perform printing. The start determining section 911 acquires the sheet counts from a sheet counter 93.

When the start determining section 911 determined to start the cleaning process, the drive control section 912 controls driving of the winding motor 55 to perform the cleaning process. Specifically, the drive control section 912 controls the winding motor 55 to perform the first operation, the second operation, and the third operation described above with reference to FIGS. 2 and 3. In the first operation, the drive control section 912 initially causes the winding motor 55 to rotate in the forward direction to circulate the linear member 54 in the first direction D1 (see FIG. 2). Next, when the contact determining section 913 determines in the first operation that the first cleaning holder 511 has come into contact with the first stopper 56a at the end of the movement track thereof, the drive control section 912 switches rotation of the winding motor 55 to rotation in the backward direction.

In the second operation, the drive control section 912 initially causes the winding motor 55 to rotate in the backward direction to circulate the linear member 54 in the second direction D2 (see FIG. 3). Next, when the contact determining section 913 determines in the second operation that the second cleaning holder 512 has conic into contact with the second stopper 56b at the end of the movement track thereof, the drive control section 912 switches rotation of the winding motor 55 to rotation in the forward direction.

In the third operation, the drive control section 912 causes the winding motor 55 to rotate in the forward direction to circulate the linear member 54 in the first direction D1 and then stops the winding motor 55 when the first cleaning holder 511 and the second cleaning holder 512 have moved to the respective standby positions HP.

When the abnormality determining section 914 determines that an abnormality has occurred, the drive control section 912 stops the winding motor 55.

The contact determining section 913 determines whether or not the cleaning holder has conic into contact with the stopper based on a current value of the winding motor 55. Here, the description "the cleaning holder has conic into contact with the stopper" means that the first cleaning holder 511 has come into contact with the first stopper 56a or the second cleaning holder 512 has come into contact with the second stopper 56b. Specifically, when a current value detected by an ammeter connected to the winding motor 55 is at least a predetermined current value AS for at least predetermined duration TA (for example, 100 msec), it is determined that the cleaning holder has come into contact with the stopper. The current value AS is for example a maximum continuous current value (for example, twice a rated current value) of the winding motor 55 or a maximum instantaneous current value (for example, four times the rated current value) of the winding motor 55.

As described above, when a current value of the winding motor 55 is at least the predetermined current value AS for at least the predetermined duration TA, it is determined that the cleaning holder has come into contact with the stopper. Therefore, contact of the cleaning holder with the stopper can be determined in a short time (for example, 100 msec). As a result, a time it takes to clean the light transmitting members 52 can be reduced.

When the contact determining section 913 determined that the cleaning holder has come into contact with the stopper in a predetermined second threshold time TS2 from a time point at which the second operation was started by the drive control section 912, the abnormality determining section 914 determines that an abnormality has occurred. Further, upon determining that the abnormality has occurred, the abnormality determining section 914 records in the abnormality storage section 921 abnormality information indicating details of the abnormality in association with information of date and time at which the abnormality occurred. The second threshold time TS2 is set to be not longer than a time it takes to perform the second operation (for example, 800 msec) under no load applied to the winding motor 55.

In the above situation, a current value of the winding motor 55 becomes at least the current value AS in the second threshold time TS2 that is not longer than the time it takes to perform the second operation under no load applied to the winding motor 55. Therefore, for example when a foreign matter gets caught between the guide rail 61 and the cleaning holder 51 illustrated in FIG. 4, it can be determined that an abnormality has occurred.

Further, the abnormality determining section 914 records in the abnormality storage section 921 the abnormality information indicating the details of the abnormality in association with the information of date and time at which the abnormality occurred. Therefore, a service person doing maintenance of the image forming apparatus 1 can know the occurrence of the abnormality. As a result, the maintenance can be facilitated.

The present embodiment is described about a case where the abnormality determining section 914 determines that an abnormality has occurred when contact is determined in a time shorter than the predetermined second threshold time TS2 from a time point at which the second operation was started. However, the abnormality determining section 914 may determine occurrence of an abnormality in other ways.

For example, the abnormality determining section 914 may determine that an abnormality has occurred when the contact determining section 913 determines that the cleaning holder has come into contact with the stopper in a predetermined first threshold time TS1 from a time point at which the first operation was started by the drive control section 912. The first threshold time TS1 is set to be not longer than a time it takes to perform the first operation (for example, 0.3 sec) under no load applied to the winding motor 55.

In the above situation, a current value of the winding motor 55 becomes at least the current value AS in the first threshold time TS1 that is not longer than the time it takes to perform the first operation under no load applied to the winding motor 55. Therefore, for example when a foreign matter gets caught between the guide rail 61 and the cleaning holder 51 illustrated in FIG. 4, it can be determined that an abnormality has occurred.

Alternatively, the abnormality determining section 914 may determine that an abnormality has occurred for example when the first operation is not yet completed after elapse of at least a predetermined third threshold time TS3 from the time point at which the first operation was started. The third threshold time TS3 is a time (for example, 5 sec) in which the first operation is surely completed in a state where the optical scanning device 12 is operating normally.

For example, when a conductive wire that supplies electricity to the winding motor 55 is cut, the winding motor 55 does not rotate and the linear member 54 does not circulate. As a result, the abnormality determining section 914 determines that an abnormality has occurred. Also, for example when there is a breakage in a torque transmitting path (gear or the like) that transmits torque of the winding motor 55 to the linear member 54, the torque of the winding motor 55 is not transmitted to the linear member 54 and the linear member 54 does not circulate. As a result, the abnormality determining section 914 determines that an abnormality has occurred.

In other words, the abnormality determining section 914 is capable of determining that the conductive wire that supplies electricity to the winding motor 55 is cut or there is a breakage in the torque transmission path (gear or the like) that transmits the torque of the winding motor 55 to the linear member 54.

Alternatively, the abnormality determining section 914 may determine that an abnormality has occurred for example when the second operation is not yet completed after elapse of at least a predetermined fourth threshold time TS4 from the time point at which the second operation was started. The fourth threshold time TS4 is a time (for example, 5 sec) in which the second operation is surely completed in a state where the optical scanning device 12 is operating normally.

For example, when the conductive wire that supplies electricity to the winding motor 55 is cut, the winding motor 55 does not rotate and the linear member 54 does not circulate. As a result, the abnormality determining section 914 determines that an abnormality has occurred. Also, for example when there is a breakage in the torque transmitting path (gear or the like) that transmits the torque of the winding motor 55 to the linear member 54, the torque of the winding motor 55 is not transmitted to the linear member 54 and the linear member 54 does not circulate. As a result, the abnormality determining section 914 determines that an abnormality has occurred.

In other words, the abnormality determining section 914 is capable of determining that the conductive wire that supplies electricity to the winding motor 55 is cut or there is a breakage in the torque transmission path (gear or the like) that transmits the torque of the winding motor 55 to the linear member 54.

Figure 11:
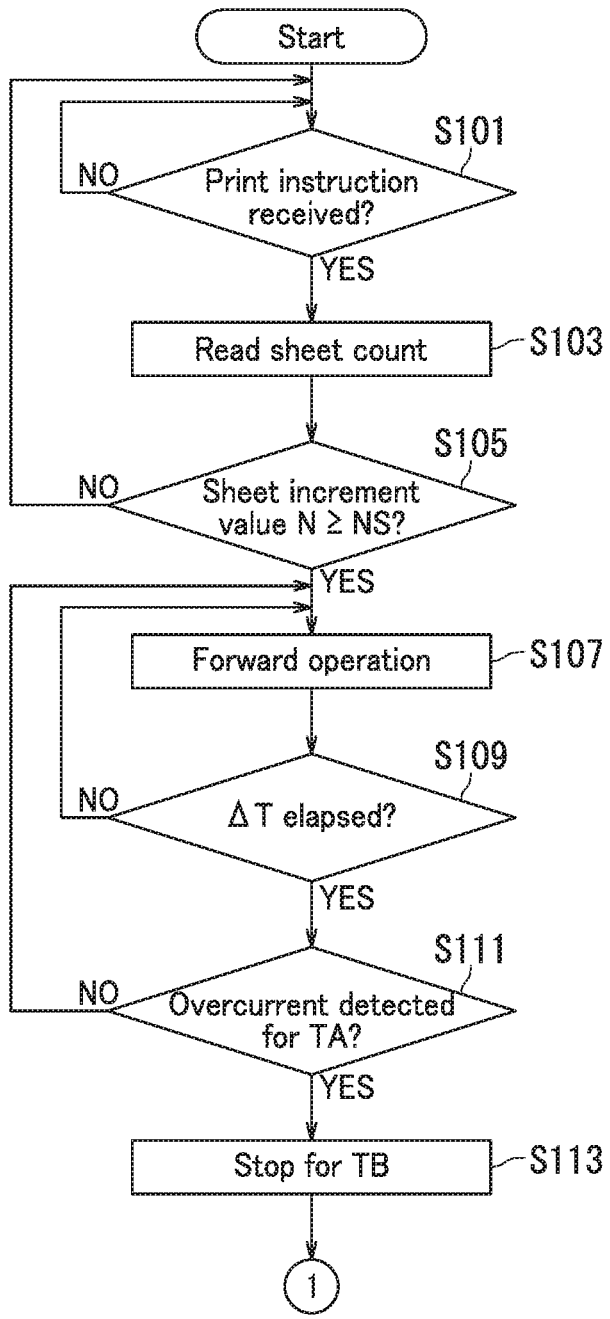
FIG. 11 is a flowchart (of a first halt) of an operation of the controller illustrated in FIG. 10.
Figure 12:
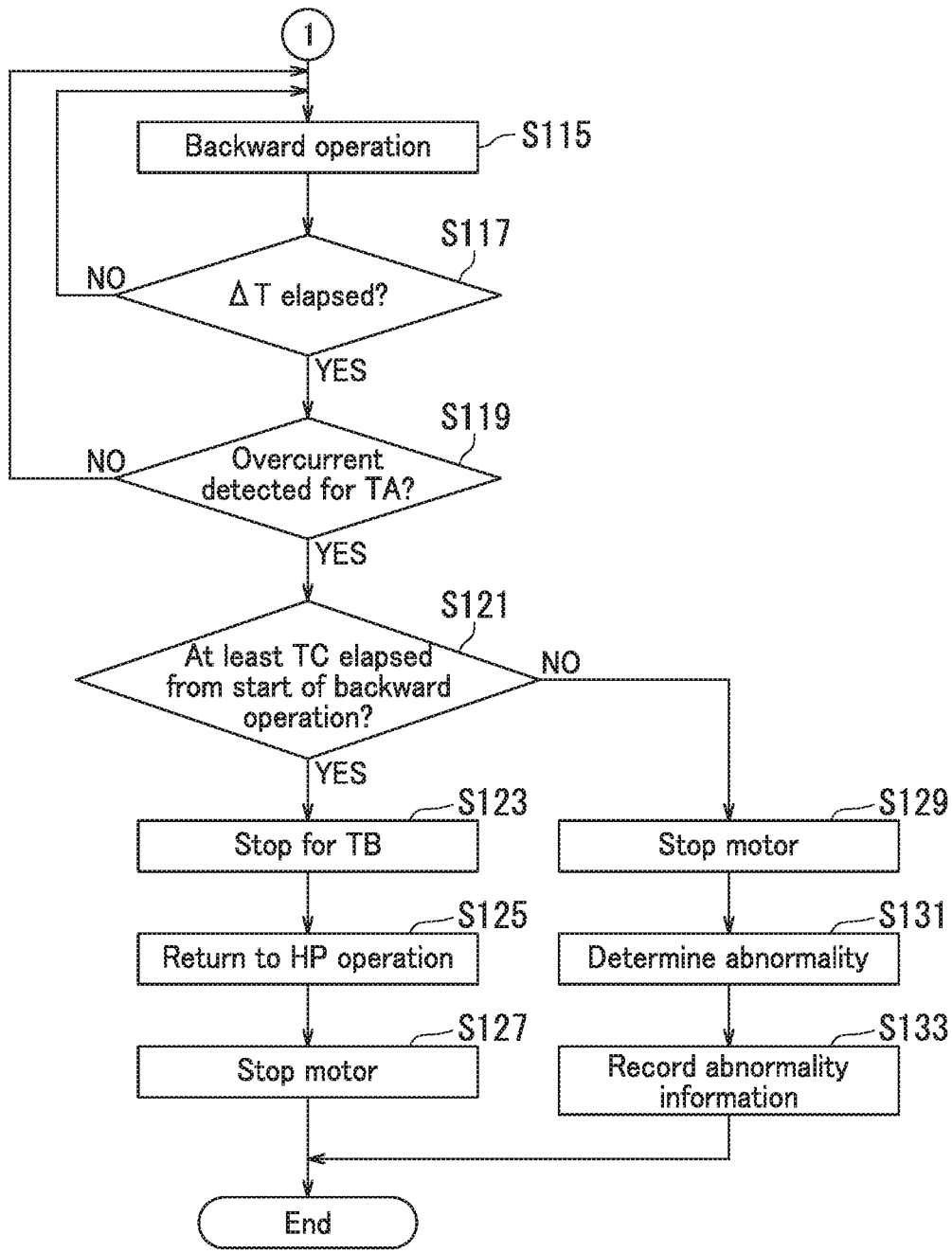
FIG. 12 is a flowchart (of a second half) of the operation of the controller illustrated in FIG. 10.

Next, the following describes an operation of the controller 91 with reference to FIGS. 11 and 12. FIG. 11 is a flowchart (of a first half) of the operation of the controller 91 illustrated in FIG. 10. FIG. 12 is a flowchart (of a second half) of the operation of the controller illustrated in FIG. 10. As illustrated in FIG. 11, the start determining section 911 initially determines whether or not a print instruction has been received (step S101). When it is determined that the print instruction has been received (YES in step S101), the process proceeds to step S103. When it is determined that the print instruction has not been received (NO in step S101), the process is suspended.

When YES in step S101, the start determining section 911 reads sheet counts from the sheet counter 93 (step S103). Then, the start determining section 911 determines whether or not a sheet increment value N is at least a threshold value NS (step S105). When it is determined that the sheet increment value N is at least the threshold value NS (YES in step S105), the process proceeds to step S107. When it is determined that the sheet increment value N is smaller than the threshold value NS (NO in step S105), the process returns to step S101.

When YES in step S105, NO in step S109, or NO in step S111, the drive control section 912 causes the winding motor 55 to rotate in the forward direction to circulate the linear member 54 in the first direction D1 (see FIG. 2) (hereinafter referred to as a forward operation) (step S107). Next, the drive control section 912 determines whether or not a startup time ΔT (for example, 200 msec) has elapsed from a time point at which the forward operation was started (step S109). When it is determined that the startup time ΔT has elapsed from the time point at which the forward operation was started (YES in step S109), the process proceeds to step S111. When it is determined that the startup time ΔT has not elapsed from the time point at which the forward operation was started (NO in step S109), the process returns to step S107.

When YES in step S109, the contact determining section 913 determines whether or not a current value detected by the ammeter 551 has been at least a predetermined current value AS for at least predetermined duration TA (for example, 100 msec) (step S111). When it is determined that the current value detected by the ammeter 551 has been at least the current value AS for at least the duration TA (YES in step S111), the process proceeds to step S113. When it is determined that the current value detected by the ammeter 551 has not been at least the current value AS for at least the duration TA (NO in step S111), the process returns to step S107.

When YES in step S111, the drive control section 912 stops the winding motor 55 for a stop time TB (for example, 200 msec) (step S113). As illustrated in FIG. 12, when step S113 ended, NO in step S117, or NO in step S119, the drive control section 912 causes the winding motor 55 to rotate in the backward direction to circulate the linear member 54 in the second direction D2 (see FIG. 3) (hereinafter referred to as a backward operation) (step S115).

Next, the drive control section 912 determines whether or not a startup time ΔT (for example, 200 msec) has elapsed from a time point at which the backward operation was started (step S117). When it is determined that the startup time ΔT has elapsed from the time point at which the backward operation was started (YES in step S117), the process proceeds to step S119. When it is determined that the startup time ΔT has not elapsed from the time point at which the backward operation was started (NO in step S117), the process returns to step S115.

When YES in step S117, the contact determining section 913 determines whether or not a current value detected by the ammeter 551 has been at least the predetermined current value AS for at least the duration TA (for example, 100 msec) (step S119). When it is determined that the current value detected by the ammeter 551 has been at least the current value AS for at least the duration TA, the process proceeds to step S121. When it is determined that the current value detected by the ammeter 551 has not been at least the current value AS for at least the duration TA (NO in step S119), the process returns to step S115.

When YES in step S119, the abnormality determining section 914 determines whether or not a predetermined threshold time TC (for example, 800 msec) has elapsed from the time point at which the backward operation was started (step S121). When it is determined that the threshold time TC has elapsed from the time point at which the backward operation was started (YES in step S121), the process proceeds to step S123. When it is determined that the threshold time TC has not elapsed from the time point at which the backward operation was started (NO in step S121), the process proceeds to step S129.

When YES in step S121, the drive control section 912 stops the winding motor 55 for the stop time TB (for example, 200 msec) (step S123). Then, the drive control section 912 causes the winding motor 55 to rotate in the forward direction to circulate the linear member 54 in the first direction D1 (see FIG. 2) and move the first cleaning holder 511 and the second cleaning holder 512 to the respective standby positions HP (step S125). Next, the drive control section 912 stops the winding motor 55 (step S127), whereby the process ends.

When NO in step S121, the drive control section 912 stops the winding motor 55 (step S129). Then, the abnormality determining section 914 determines that an abnormality has occurred (step S131). Next, the abnormality determining section 914 records in the abnormality storage section 921 abnormality information indicating details of the abnormality in association with information of date and time at which the abnormality occurred (step S133), whereby the process ends.

Right after startup of the winding motor 55, a large load is applied to the winding motor 55 by inertia. At this time, the contact determining section 913 may determine that a current value detected by the ammeter 551 has been at least the predetermined current value AS for at least the duration TA. Therefore, whether or not the cleaning holder has come into contact with the stopper is determined (step S111 and step S119) after the startup time ΔT has elapsed (step S109 and step S117) as described above. As a result, the contact determining section 913 can correctly determine whether or not the cleaning holder has come into contact with the stopper.

Also, in a situation in which a direction of rotation of the winding motor 55 is changed without stopping the winding motor 55, a large load is applied to the winding motor 55 by inertia. At this time, the contact determining section 913 may determine that a current value detected by the ammeter 551 has been at least the predetermined current value AS for at least the duration TA. Therefore, the winding motor 55 is stopped for the stop time TB (step S113 and step S123) before a direction of rotation of the winding motor 55 is changed as described above. As a result, the contact determining section 913 can correctly determine whether or not the cleaning holder has come into contact with the stopper.

Through the above, the specific embodiment of the present invention has been described. However, the present invention is not limited to the above embodiment and various alterations may be made to the above embodiment.

For example, the looping pulleys 57 are used in the above embodiment to loop the linear member 54 substantially in a circle. However, members used to loop the linear member 54 substantially in a circle are not limited to pulleys. For example, a plurality of protrusions may be provided on the outer surface of the cover portion 12c, and the linear member 54 may be wound around the protrusions rather than the looping pulleys 57. Similarly, at least one protrusion may be provided in place of the tension adjusting pulley 58 as a tension adjusting member on the outer surface of the cover portion 12c.

Although the single tension adjusting pulley 58 is provided in the above embodiment, the number of the tension adjusting pulley 58 is not particularly limited.

Further, although the tension adjusting pulley 58 is provided as the tension adjusting member for adjusting tension applied to the linear member 54, the tension adjusting member may be omitted.

Also, although the winding drum 59 is provided in the above embodiment, the winding drum 59 may be omitted.

Although the above embodiment was described about a case where the recording medium is paper, a recording medium other than the paper may be used (for example, a resin sheet or a cloth).

Although the tandem-type color printer was described in the above embodiment, the present invention is not limited to the above embodiment, and may be applicable to electrophotographic image forming apparatuses such as a color copier and a facsimile machine.

Although the optical scanning device 12 is provided below the photosensitive drums 11a to 11d in the above embodiment, the optical scanning device 12 may be provided above the photosensitive drums 11a to 11d.

Although the above embodiment was described about a case where the winding motor 55 is a direct current motor with a brush, the winding motor 55 may be a different type of motor. For example, the winding motor 55 may be a brushless direct current motor. Alternatively, the winding motor 55 may for example be an alternating current motor.

Properties of elements of configuration described in the above embodiment, such as materials and shapes thereof, are merely examples and are not intended as specific limitations.

The properties may be altered in various ways, so long as such alterations do not substantially deviate from effects of the present invention.

Various alterations other than those described above may be made within a scope not departing from the gist of the present invention.

INDUSTRIAL APPLICABILITY

The present invention is applicable to an image forming apparatus including an optical scanning device that irradiates image bearing members with light to form electrostatic latent images thereon.

The invention claimed is:

1. An image forming apparatus including an optical scanning device that irradiates a plurality of image bearing members with laser light to form electrostatic latent images thereon, the image forming apparatus comprising:
   a housing having a plurality of laser light exit openings arranged side by side, the laser light exit openings each corresponding to one of the image bearing members and extending in a main scanning direction of the laser light;
   a plurality of light transmitting members capable of transmitting the laser light, each covering one of the laser light exit openings and extending in the main scanning direction of the laser light;
   a plurality of cleaning members each located at a position corresponding to one of the light transmitting members and configured to clean the corresponding one of the light transmitting members by sliding thereon;
   a linear member looped in a circle about the housing;
   a drive motor configured to circulate the linear member in a first direction and a second direction different from the first direction;
   first and second cleaning holders each holding at least two of the cleaning members and configured to move in respective directions of extension of the light transmitting members when the linear member is circulated by the drive motor;
   a first stopper provided at an end of a movement track of the first cleaning holder and configured to restrict movement of the first cleaning holder in one of the directions of extension of the light transmitting members when the first cleaning holder comes into contact with the first stopper;
   a second stopper provided at an end of a movement track of the second cleaning holder and configured to restrict movement of the second cleaning holder in one of the directions of extension of the light transmitting members when the second cleaning holder comes into contact with the second stopper; and
   a contact determining section configured to determine, based on a current value of the drive motor, that the first cleaning holder has come into contact with the first stopper and that the second cleaning holder has come into contact with the second stopper;
   a drive control section configured to control the drive motor, wherein
   the drive control section controls the drive motor to perform a first operation and a second operation,
   the first operation is an operation by which
      the linear member is circulated in the first direction to move the first cleaning holder in one of the directions of extension of the light transmitting members and move the second cleaning holder in the other of the directions of extension of the light transmitting members, and
      when the first cleaning holder comes into contact with the first stopper at the end of the movement track thereof, a direction in which the linear member is circulated is switched from the first direction to the second direction, and
   the second operation is an operation by which
      the linear member is circulated in the second direction to move the first cleaning holder in the other of the directions of extension of the light transmitting members and move the second cleaning holder in the one of the directions of extension of the light transmitting members, and
      when the second cleaning holder comes into contact with the second stopper at the end of the movement track thereof, circulation of the linear member is stopped,
   the image forming apparatus further comprising an abnormality determining section configured to determine occurrence of an abnormality, wherein
   the abnormality determining section determines that an abnormality has occurred when the contact determining section determines that the first cleaning holder has come into contact with the first stopper in a predetermined first threshold time from a time point at which the first operation was started by the drive control section after a startup time has elapsed from the time point at which the first operation was started by the drive control section.

2. The image forming apparatus according to claim 1, wherein
   the drive motor is a direct current motor, and
   when the current value of the drive motor is at least a predetermined current value, the contact determining section determines that the first cleaning holder has come into contact with the first stopper or the second cleaning holder has come into contact with the second stopper.

3. The image forming apparatus according to claim 1, wherein
   when the contact determining section determines that the second cleaning holder has come into contact with the second stopper in a predetermined second threshold time from a time point at which the second operation was started by the drive control section after a startup time has elapsed from the time point at which the second operation was started by the drive control section, the abnormality determining section determines that an abnormality has occurred.

4. The image forming apparatus according to claim 3, wherein
   the first threshold time is set to be not longer than a time it takes to perform the first operation under no load applied to the drive motor, and
   the second threshold time is set to be not longer than a time it takes to perform the second operation under no load applied to the drive motor.

5. The image forming apparatus according to claim 1, wherein
   when the first operation is not yet completed after elapse of at least a predetermined third threshold time from the time point at which the first operation was started, the abnormality determining section determines that an abnormality has occurred.

6. The image forming apparatus according to claim 1, wherein
when the second operation is not yet completed after elapse of at least a predetermined fourth threshold time from a time point at which the second operation was started, the abnormality determining section determines that an abnormality has occurred.

7. The image forming apparatus according to claim 1, wherein
after the first operation and the second operation are performed, the drive control section controls the drive motor to perform a third operation by which
the linear member is circulated in the first direction for a predetermined return time to move the first cleaning holder in the one of the directions of extension of the light transmitting members to a predetermined standby position and move the second cleaning holder in the other of the directions of extension of the light transmitting members to a predetermined standby position.

8. The image forming apparatus according to claim 1, wherein
the drive motor is a direct current motor, and
when the current value of the drive motor is at least a predetermined current value for at least predetermined duration, the contact determining section determines that the first cleaning holder has come into contact with the first stopper or the second cleaning holder has come into contact with the second stopper.

9. The image forming apparatus according to claim 1, wherein
the first cleaning holder includes a first holding member holding at least two of the cleaning members,
the first holding member has a first recess in an upper part thereof,
a spherical first coupling member is loosely fitted in the first recess,
the first coupling member is fixed to the linear member,
the second cleaning holder includes a second holding member holding at least two of the cleaning members,
the second holding member has a second recess in an upper part thereof,
a spherical second coupling member is loosely fitted in the second recess,
the second coupling member is fixed to the linear member, and
the second coupling member differs from the first coupling member.

* * * * *